Patented Mar. 1, 1932

1,847,196

UNITED STATES PATENT OFFICE

WALTER J. SCOTT, OF BROOKFIELD, ILLINOIS, ASSIGNOR TO WESTERN ELECTRIC COMPANY, INCORPORATED, OF NEW YORK, N. Y., A CORPORATION OF NEW YORK

CERAMIC MATERIAL AND METHOD OF MANUFACTURING CERAMIC ARTICLES

No Drawing.  Application filed January 8, 1930. Serial No. 419,456.

This invention relates to a ceramic material and a method of manufacturing ceramic articles, and more particularly to a ceramic material designed for use in molding articles, and to a method of molding articles from such material.

Objects of the invention are to provide an improved ceramic material for use in molding articles, and to provide a method of molding ceramic articles from such material which may be performed by the use of automatic machinery.

One embodiment of the invention comprises a material including talc and clay or other plastic as its chief ingredients, the materials being intermingled with a temporary bonding material and formed into granules of definite size, which granules are then molded into the desired shape in pressure dies. In order to prevent the material from adhering to the dies, the granules, before being introduced into the dies, are coated with a small quantity of a soap such as zinc stearate, which so reduces the tendency of the material to adhere to the dies that the dies remain clean after repeating molding operations, so that the molding operation may be performed by the use of automatic machinery with a minimum of attention on the part of the operator.

The invention will be more fully understood from the following detailed description of a preferred embodiment thereof:

In the manufacture of certain articles having electrical insulating properties, powdered talc and kaolin together with a solution of paraffin and wax in carbon tetrachloride, are ground together in a ball mill to form a viscous suspension. The resulting material is then dried to form a hard plastic mass which is then broken up into small particles. The particles may then be screened to select therefrom only those of the proper size.

The process just described is set forth more fully in the application of Walter J. Scott, Serial No. 291,948, filed July 11, 1928, and the application of Leon I. Shaw and Walter J. Scott, Serial No. 416,488, filed December 26, 1929. In accordance with the present invention, the selected particles or granules are then mixed with about 0.2 per cent of zinc stearate and the material is gently tumbled or agitated to cause the zinc stearate to form a thin coating over the granules. The material is then placed in dies and molded under pressure to the desired form, after which it may be baked to the desired hardness and strength. The soap, being on the outer surface of the granules, contacts with the dies and lubricates them, thereby preventing the material from sticking to the dies, and has no deleterious effect on the molded product.

By the use of the above described method, the molding operation may be made substantially automatic; that is, the granular material, coated as above described, may be placed in a hopper which is moved across the face of a horizontal die to a position where the outlet of the hopper registers with the mold cavity, whereupon the granular material fills the mold cavity. The hopper is then retracted across the face of the die, removing the excess molding material, whereupon a male die is forced into the mold cavity to mold the material into the desired shape. After the article has been molded, it may be raised to the surface of the die plate by a knock-out member or other means known in the art, whereupon the hopper is again moved across the face of the die plate, moving the molded article into a receptacle positioned alongside of the die, and again filling the mold cavity.

The molded articles formed in accordance with this invention include fewer defective articles since the articles are not injured by sticking to the dies, and the practice of this invention eliminates the necessity for coating the dies with oil or other lubricant, which is partially absorbed by the molding material and weakens the bond between the particles of the molding material, thereby weakening the molded articles.

In the case of molding material which is in plastic or powdered form, the soap may be incorporated therein by mixing the ingredients together in a mill, the amount of soap being necessarily greater because not merely the surfaces are to be coated but a sufficient amount is to be added to permeate the entire mass. Examples of soaps which may be used are the sodium, potassium and zinc salts of stearic, oleic and palmitic acids, the particular soap chosen being a matter of cheapness and also of the desirability of adding water to the material. In the case of material which would be detrimentally affected by the presence of the soap, or in case it is found impracticable to incorporate the soap into the material, the soap, preferably in the form of a solution or suspension in liquid, may be applied directly to the dies, as by spraying or painting.

What is claimed is:

1. A material for molding under pressure, comprising granular ceramic material, the granules of which are coated with a soap.

2. A material for molding under pressure, comprising granular ceramic material, the granules of which are coated with about 0.2 per cent of zinc stearate.

3. A method of manufacturing ceramic articles, comprising forming ceramic material into granules, coating the granules with a small amount of soap, and molding the resulting material under pressure.

4. A method of manufacturing ceramic articles, comprising mixing ceramic material with a temporary binder, incorporating soap into the resulting mixture, and molding the mixture under pressure.

5. A method of manufacturing ceramic articles, comprising mixing talc and kaolin with a wax, incorporating soap into the resulting mixture, and molding the mixture under pressure.

6. A method of manufacturing ceramic articles, comprising mixing talc and kaolin with a temporary binder, forming the resulting mixture into granules, coating the granules with soap, and molding the mixture under pressure.

7. A method of manufacturing ceramic articles, comprising mixing talc and kaolin with paraffin, forming the resulting mixture into granules, coating the granules with a small amount of zinc stearate, and molding the mixture under pressure.

8. A method of manufacturing ceramic articles, comprising mixing ceramic material with a temporary binder, forming the resulting mixture into granules, coating the granules with a small amount of soap, molding the mixture in a die under pressure, and banking the molded article.

In witness whereof, I hereunto subscribe my name this 28 day of December, A. D. 1929.

WALTER J. SCOTT.